(12) United States Patent
Rhoads et al.

(10) Patent No.: US 7,949,147 B2
(45) Date of Patent: *May 24, 2011

(54) WATERMARKING COMPRESSED DATA

(75) Inventors: Geoffrey B. Rhoads, West Linn, OR (US); Clayton L. Davidson, Lake Oswego, OR (US); Tony F. Rodriguez, Portland, OR (US)

(73) Assignee: Digimarc Corporation, Beaverton, OR (US)

( * ) Notice: Subject to any disclaimer, the term of this patent is extended or adjusted under 35 U.S.C. 154(b) by 1014 days.

This patent is subject to a terminal disclaimer.

(21) Appl. No.: 11/562,357

(22) Filed: Nov. 21, 2006

(65) Prior Publication Data

US 2007/0154064 A1   Jul. 5, 2007

Related U.S. Application Data

(63) Continuation of application No. 10/953,134, filed on Sep. 28, 2004, now Pat. No. 7,139,408, which is a continuation of application No. 09/778,307, filed on Feb. 6, 2001, now Pat. No. 6,798,894, which is a continuation of application No. 09/138,061, filed on Aug. 21, 1998, now Pat. No. 6,229,924.

(60) Provisional application No. 60/056,968, filed on Aug. 26, 1997.

(51) Int. Cl.
*H04K 1/00* (2006.01)

(52) U.S. Cl. ...................................... 382/100

(58) Field of Classification Search .................. 382/100, 382/232, 248, 250, 280, 284, 287; 380/4, 380/23, 25, 51, 54, 216, 217; 348/475; 235/394; 358/3.28, 448, 450, 454, 124, 142; 705/50, 705/51; 713/176

See application file for complete search history.

(56) References Cited

U.S. PATENT DOCUMENTS

| | | | |
|---|---|---|---|
| 4,939,515 A | 7/1990 | Adelson | |
| 4,969,041 A | 11/1990 | O'Grady et al. | |
| 5,319,735 A | 6/1994 | Preuss et al. | |
| 5,337,361 A | 8/1994 | Wang et al. | |
| 5,530,751 A | 6/1996 | Morris | |
| 5,530,759 A | 6/1996 | Braudaway et al. | |

(Continued)

FOREIGN PATENT DOCUMENTS

DE    29 43 436    5/1981

(Continued)

OTHER PUBLICATIONS

WordPackage 8: Watermarking, pp. 1-46, "Access Control and COpyright Protection for Images, WorkPackage 8: Watermarking," Jun. 30, 1995, 46 pages.

(Continued)

*Primary Examiner* — Jose L Couso

(57) ABSTRACT

A method of embedding auxiliary data in coefficients generated for a compressed data stream applies embedding rules to selected coefficients in different blocks to embed the data. The method receives coefficients in a data stream in which the coefficients are divided into blocks. It changes the value of selected coefficients to embed multi-bit message data in the coefficients. The process of changing the coefficients includes controlling changes to the selected coefficients from different blocks so that the relationship of the selected coefficients from the different blocks satisfy an embedding rule. One embedding rule causes the embedded data to form a pattern across the blocks. Another rule causes coefficients of blocks to have a desired phase relationship. Another rule enforces entropy and/or bit rate constraints onto the data stream. These embedding rules facilitate data hiding within bit rate and perceptibility constraints, while increasing robustness.

26 Claims, 4 Drawing Sheets

U.S. PATENT DOCUMENTS

| | | | |
|---|---|---|---|
| 5,613,004 A | 3/1997 | Cooperman et al. |
| 5,636,292 A | 6/1997 | Rhoads |
| 5,646,997 A | 7/1997 | Barton |
| 5,652,626 A | 7/1997 | Kawakami et al. |
| 5,659,726 A | 8/1997 | Sandford, II et al. |
| 5,663,766 A | 9/1997 | Sizer |
| 5,664,018 A | 9/1997 | Leighton |
| 5,668,898 A | 9/1997 | Tatsuta |
| 5,687,191 A | 11/1997 | Lee et al. |
| 5,687,236 A | 11/1997 | Moskowitz et al. |
| 5,710,834 A | 1/1998 | Rhoads |
| 5,721,788 A | 2/1998 | Powell |
| 5,727,092 A | 3/1998 | Sandford et al. |
| 5,745,604 A | 4/1998 | Rhoads |
| 5,748,783 A | 5/1998 | Rhoads |
| 5,768,426 A | 6/1998 | Rhoads |
| 5,778,102 A | 7/1998 | Sandford et al. |
| 5,799,092 A | 8/1998 | Kristol et al. |
| 5,809,139 A | 9/1998 | Girod et al. |
| 5,832,119 A | 11/1998 | Rhoads |
| 5,835,639 A | 11/1998 | Honsinger et al. |
| 5,841,886 A | 11/1998 | Rhoads |
| 5,848,155 A | 12/1998 | Cox et al. |
| 5,857,038 A | 1/1999 | Owada et al. |
| 5,859,920 A | 1/1999 | Daly et al. |
| 5,862,260 A | 1/1999 | Rhoads |
| 5,901,178 A | 5/1999 | Lee et al. |
| 5,903,892 A | 5/1999 | Hoffert |
| 5,905,819 A | 5/1999 | Daly |
| 5,915,027 A | 6/1999 | Cox et al. |
| 5,915,044 A | 6/1999 | Gardos et al. |
| 5,930,369 A | 7/1999 | Cox |
| 5,930,377 A | 7/1999 | Powell et al. |
| 5,933,798 A | 8/1999 | Linnartz |
| 5,946,414 A | 8/1999 | Cass et al. |
| 5,949,055 A | 9/1999 | Fleet et al. |
| 5,949,885 A | 9/1999 | Leighton |
| 5,956,716 A | 9/1999 | Kenner |
| 5,960,081 A | 9/1999 | Vynne |
| 5,983,176 A | 11/1999 | Hoffert |
| 5,987,459 A | 11/1999 | Swanson |
| 6,005,643 A | 12/1999 | Morimoto et al. |
| 6,018,593 A | 1/2000 | Yamagata |
| 6,026,193 A | 2/2000 | Rhoads |
| 6,031,914 A | 2/2000 | Tewfik et al. |
| 6,037,984 A | 3/2000 | Isnardi |
| 6,061,451 A | 5/2000 | Muratani |
| 6,061,793 A | 5/2000 | Tewfik |
| 6,069,914 A | 5/2000 | Cox |
| 6,094,722 A | 7/2000 | Astola |
| 6,104,826 A | 8/2000 | Nakagawa |
| 6,108,434 A | 8/2000 | Cox |
| 6,122,403 A | 9/2000 | Rhoads |
| 6,181,813 B1 | 1/2001 | Fan |
| 6,208,745 B1 | 3/2001 | Florencio et al. |
| 6,211,919 B1 | 4/2001 | Zink et al. |
| 6,226,387 B1 | 5/2001 | Tewfik et al. |
| 6,229,924 B1 | 5/2001 | Rhoads et al. |
| 6,266,419 B1 | 7/2001 | Lacy et al. |
| 6,266,430 B1 | 7/2001 | Rhoads |
| 6,282,299 B1 | 8/2001 | Tewfik et al. |
| 6,285,776 B1 | 9/2001 | Rhoads |
| 6,307,949 B1 | 10/2001 | Rhoads |
| 6,311,214 B1 | 10/2001 | Rhoads |
| 6,314,192 B1 | 11/2001 | Chen |
| 6,332,030 B1 | 12/2001 | Manjunath et al. |
| 6,334,187 B1 | 12/2001 | Kadono |
| 6,343,138 B1 | 1/2002 | Rhoads |
| 6,345,104 B1 | 2/2002 | Rhoads |
| 6,359,985 B1 | 3/2002 | Koch et al. |
| 6,373,965 B1 | 4/2002 | Liang |
| 6,381,341 B1 | 4/2002 | Rhoads |
| 6,385,329 B1 | 5/2002 | Sharma et al. |
| 6,385,330 B1 | 5/2002 | Powell et al. |
| 6,408,082 B1 | 6/2002 | Rhoads et al. |
| 6,411,392 B1 | 6/2002 | Bender et al. |
| 6,411,725 B1 | 6/2002 | Rhoads |
| 6,421,070 B1 | 7/2002 | Ramos et al. |
| 6,424,725 B1 | 7/2002 | Rhoads et al. |
| 6,424,726 B2 | 7/2002 | Nakano et al. |
| 6,449,379 B1 | 9/2002 | Rhoads |
| 6,483,927 B2 | 11/2002 | Brunk et al. |
| 6,516,079 B1 | 2/2003 | Rhoads et al. |
| 6,522,770 B1 | 2/2003 | Seder et al. |
| 6,522,771 B2 | 2/2003 | Rhoads |
| 6,535,617 B1 | 3/2003 | Hannigan et al. |
| 6,542,927 B2 | 4/2003 | Rhoads |
| 6,553,129 B1 | 4/2003 | Rhoads |
| 6,563,936 B2 | 5/2003 | Brill et al. |
| 6,567,533 B1 | 5/2003 | Rhoads |
| 6,580,808 B2 | 6/2003 | Rhoads |
| 6,580,819 B1 | 6/2003 | Rhoads |
| 6,590,996 B1 | 7/2003 | Rhoads et al. |
| 6,608,919 B1 | 8/2003 | Alattar |
| 6,611,607 B1 | 8/2003 | Davis et al. |
| 6,614,914 B1 | 9/2003 | Rhoads et al. |
| 6,625,297 B1 | 9/2003 | Bradley |
| 6,647,128 B1 | 11/2003 | Rhoads |
| 6,647,130 B2 | 11/2003 | Rhoads |
| 6,650,761 B1 | 11/2003 | Rodriguez et al. |
| 6,674,876 B1 | 1/2004 | Hannigan et al. |
| 6,681,028 B2 | 1/2004 | Rhoads et al. |
| 6,681,029 B1 | 1/2004 | Rhoads |
| 6,694,042 B2 | 2/2004 | Seder et al. |
| 6,694,043 B2 | 2/2004 | Seder et al. |
| 6,700,990 B1 | 3/2004 | Rhoads |
| 6,700,995 B2 | 3/2004 | Reed |
| 6,704,869 B2 | 3/2004 | Rhoads et al. |
| 6,711,276 B1 | 3/2004 | Yoshiura et al. |
| 6,718,046 B2 | 4/2004 | Reed et al. |
| 6,718,047 B2 | 4/2004 | Rhoads |
| 6,721,440 B2 | 4/2004 | Reed et al. |
| 6,754,377 B2 | 6/2004 | Rhoads |
| 6,760,463 B2 | 7/2004 | Rhoads |
| 6,763,123 B2 | 7/2004 | Reed et al. |
| 6,768,809 B2 | 7/2004 | Rhoads et al. |
| 6,771,795 B1 | 8/2004 | Isnardi |
| 6,775,392 B1 | 8/2004 | Rhoads |
| 6,798,894 B2 | 9/2004 | Rhoads |
| 6,813,366 B1 | 11/2004 | Rhoads |
| 6,823,075 B2 | 11/2004 | Perry |
| 6,879,701 B1 | 4/2005 | Rhoads |
| 6,917,724 B2 | 7/2005 | Seder et al. |
| 6,920,232 B2 | 7/2005 | Rhoads |
| 6,947,571 B1 | 9/2005 | Rhoads et al. |
| 6,959,098 B1 | 10/2005 | Alattar |
| 6,961,444 B2 | 11/2005 | Levy |
| 6,973,197 B2 | 12/2005 | Miller |
| 6,975,744 B2 | 12/2005 | Sharma et al. |
| 6,975,746 B2 | 12/2005 | Davis et al. |
| 6,988,202 B1 | 1/2006 | Rhoads et al. |
| 6,993,153 B2 | 1/2006 | Bradley |
| 6,996,252 B2 | 2/2006 | Reed et al. |
| 6,999,598 B2 | 2/2006 | Foote et al. |
| 7,003,731 B1 | 2/2006 | Rhoads et al. |
| 7,024,016 B2 | 4/2006 | Rhoads et al. |
| 7,027,614 B2 | 4/2006 | Reed |
| 7,035,427 B2 | 4/2006 | Rhoads |
| 7,044,395 B1 | 5/2006 | Rhoads et al. |
| 7,051,086 B2 | 5/2006 | Rhoads et al. |
| 7,054,465 B2 | 5/2006 | Rhoads |
| 7,062,069 B2 | 6/2006 | Rhoads |
| 7,095,871 B2 | 8/2006 | Jones et al. |
| 7,111,170 B2 | 9/2006 | Rhoads et al. |
| 7,113,614 B2 | 9/2006 | Rhoads |
| 7,139,408 B2 | 11/2006 | Rhoads et al. |
| 7,158,654 B2 | 1/2007 | Rhoads |
| 7,164,780 B2 | 1/2007 | Brundage et al. |
| 7,171,016 B1 | 1/2007 | Rhoads |
| 7,174,031 B2 | 2/2007 | Rhoads et al. |
| 7,177,443 B2 | 2/2007 | Rhoads |
| 7,213,757 B2 | 5/2007 | Jones et al. |
| 7,224,819 B2 | 5/2007 | Levy et al. |
| 7,248,717 B2 | 7/2007 | Rhoads |
| 7,261,612 B1 | 8/2007 | Hannigan et al. |
| 7,305,104 B2 | 12/2007 | Carr et al. |
| 7,308,110 B2 | 12/2007 | Rhoads |

| | | |
|---|---|---|
| 7,313,251 B2 | 12/2007 | Rhoads |
| 7,319,775 B2 | 1/2008 | Sharma et al. |
| 7,330,564 B2 | 2/2008 | Brundage et al. |
| 7,369,678 B2 | 5/2008 | Rhoads |
| 7,377,421 B2 | 5/2008 | Rhoads |
| 7,391,880 B2 | 6/2008 | Reed et al. |
| 7,406,214 B2 | 7/2008 | Rhoads et al. |
| 7,424,131 B2 | 9/2008 | Alattar et al. |
| 7,427,030 B2 | 9/2008 | Jones et al. |
| 7,433,491 B2 | 10/2008 | Rhoads |
| 7,444,000 B2 | 10/2008 | Rhoads |
| 7,444,392 B2 | 10/2008 | Rhoads et al. |
| 7,450,734 B2 | 11/2008 | Rodriguez et al. |
| 7,460,726 B2 | 12/2008 | Levy et al. |
| 7,466,840 B2 | 12/2008 | Rhoads |
| 7,486,799 B2 | 2/2009 | Rhoads |
| 7,502,759 B2 | 3/2009 | Hannigan et al. |
| 7,508,955 B2 | 3/2009 | Carr et al. |
| 7,515,733 B2 | 4/2009 | Rhoads |
| 7,536,034 B2 | 5/2009 | Rhoads et al. |
| 7,537,170 B2 | 5/2009 | Reed et al. |
| 7,545,952 B2 | 6/2009 | Brundage et al. |
| 7,564,992 B2 | 7/2009 | Rhoads |
| RE40,919 E | 9/2009 | Rhoads |
| 7,602,978 B2 | 10/2009 | Levy et al. |
| 7,628,320 B2 | 12/2009 | Rhoads |
| 7,643,649 B2 | 1/2010 | Davis et al. |
| 7,650,009 B2 | 1/2010 | Rhoads |
| 7,653,210 B2 | 1/2010 | Rhoads |
| 7,657,058 B2 | 2/2010 | Sharma |
| 7,685,426 B2 | 3/2010 | Ramos et al. |
| 7,693,300 B2 | 4/2010 | Reed et al. |
| 7,697,719 B2 | 4/2010 | Rhoads |
| 7,711,143 B2 | 5/2010 | Rhoads |
| 7,738,673 B2 | 6/2010 | Reed |
| 7,747,038 B2 | 6/2010 | Rhoads |
| 7,751,588 B2 | 7/2010 | Rhoads |
| 7,751,596 B2 | 7/2010 | Rhoads |
| 7,756,290 B2 | 7/2010 | Rhoads |
| 7,760,905 B2 | 7/2010 | Rhoads et al. |
| 7,762,468 B2 | 7/2010 | Reed et al. |
| 7,787,653 B2 | 8/2010 | Rhoads |
| 7,792,325 B2 | 9/2010 | Rhoads et al. |
| 2001/0019611 A1 | 9/2001 | Hilton |
| 2001/0034705 A1 | 10/2001 | Rhoads et al. |
| 2001/0053237 A1 | 12/2001 | Hashimoto et al. |
| 2001/0055407 A1 | 12/2001 | Rhoads |
| 2002/0009208 A1 | 1/2002 | Alattar et al. |
| 2002/0076083 A1 | 6/2002 | Levy |
| 2002/0108043 A1 | 8/2002 | Tanaka |
| 2002/0131076 A1 | 9/2002 | Davis |
| 2002/0164046 A1 | 11/2002 | Walker et al. |
| 2002/0172394 A1 | 11/2002 | Venkatesan et al. |
| 2002/0172395 A1 | 11/2002 | Foote et al. |
| 2002/0176003 A1 | 11/2002 | Seder et al. |
| 2002/0186886 A1 | 12/2002 | Rhoads |
| 2002/0191810 A1 | 12/2002 | Fudge et al. |
| 2002/0196272 A1 | 12/2002 | Ramos et al. |
| 2003/0021439 A1 | 1/2003 | Lubin et al. |
| 2003/0040957 A1 | 2/2003 | Rhoads et al. |
| 2003/0059082 A1 | 3/2003 | Suzuki et al. |
| 2003/0105730 A1 | 6/2003 | Davis et al. |
| 2003/0123659 A1 | 7/2003 | Forstrom et al. |
| 2003/0130954 A1 | 7/2003 | Carr et al. |
| 2003/0185417 A1 | 10/2003 | Alattar et al. |
| 2004/0005093 A1 | 1/2004 | Rhoads |
| 2004/0125952 A1 | 7/2004 | Alattar et al. |
| 2004/0190750 A1 | 9/2004 | Rodriguez et al. |
| 2004/0240704 A1 | 12/2004 | Reed |
| 2004/0264733 A1 | 12/2004 | Rhoads et al. |
| 2005/0041835 A1 | 2/2005 | Reed et al. |
| 2005/0058318 A1 | 3/2005 | Rhoads |
| 2005/0192933 A1 | 9/2005 | Rhoads et al. |
| 2006/0013435 A1 | 1/2006 | Rhoads |
| 2006/0041591 A1 | 2/2006 | Rhoads |
| 2006/0120559 A1 | 6/2006 | Levy |
| 2006/0251291 A1 | 11/2006 | Rhoads |
| 2007/0055884 A1 | 3/2007 | Rhoads |
| 2007/0108287 A1 | 5/2007 | Davis et al. |
| 2007/0276841 A1 | 11/2007 | Rhoads et al. |
| 2007/0276928 A1 | 11/2007 | Rhoads et al. |
| 2008/0121728 A1 | 5/2008 | Rodriguez |
| 2008/0133555 A1 | 6/2008 | Rhoads et al. |
| 2008/0292134 A1 | 11/2008 | Sharma et al. |
| 2009/0012944 A1 | 1/2009 | Rodriguez et al. |
| 2009/0067671 A1 | 3/2009 | Alattar |
| 2009/0116687 A1 | 5/2009 | Rhoads et al. |
| 2009/0125475 A1 | 5/2009 | Rhoads et al. |
| 2009/0232352 A1 | 9/2009 | Carr et al. |
| 2009/0286572 A1 | 11/2009 | Rhoads et al. |
| 2009/0290754 A1 | 11/2009 | Rhoads |
| 2010/0027837 A1 | 2/2010 | Levy et al. |
| 2010/0045816 A1 | 2/2010 | Rhoads |
| 2010/0062819 A1 | 3/2010 | Hannigan et al. |
| 2010/0094639 A1 | 4/2010 | Rhoads |
| 2010/0141779 A1 | 6/2010 | Rhoads |
| 2010/0142749 A1 | 6/2010 | Ellingson et al. |
| 2010/0172540 A1 | 7/2010 | Davis et al. |
| 2010/0198941 A1 | 8/2010 | Rhoads |

FOREIGN PATENT DOCUMENTS

| | | |
|---|---|---|
| EP | 0824821 | 2/1998 |
| EP | 1217840 | 6/2002 |
| JP | 3-185585 | 8/1991 |
| WO | WO9827510 | 6/1998 |
| WO | WO02060182 | 8/2002 |

OTHER PUBLICATIONS

Arena et al., "Digital watermarking applied to MPEG-2 coded video sequences exploiting space and frequency masking," *Proceedings of the IEEE Internal Conference on Image Processing '00*, Vancouver, Canada, 2000.

Barni et al., "Object watermarking for MPEG-4 video streams copyright protection," *Proceedings of the SPIE Security and Watermarking of Multimedia Contents II*, Wong, Delp, Editors, vol. 3671, San Jose, California, Jan. 2000, pp. 465-476.

Bas et al., "A new video-object watermarking scheme robust to object manipulation," *Proceedings of the IEEE International Conference on Image Processing '01*, Thessaloniki, Greece, 2001, pp. 526-529.

Basso, et al., "Study of MPEG-2 coding performance based on a perceptual quality metric," *Proceedings of the 1996 Picture Coding Symposium*, Australia, Mar. 1996, pp. 263-268.

Bender, "Techniques for Data Hiding," SPIE vol. 2420, pp. 164-173, 1995.

Bors et al., "Image Watermarking Using DCT Domain Constraints," Proc. IEEE Int. Conf. on Image Processing, vol. 3, Sep. 1996, pp. 231-234.

Brassil et al., "Electronic Marking and Identification Techniques to Discourage Document Copying", Proceedings of INFOCOM '94 Conference on Computer, IEEE Commun. Soc Conference, Jun. 12-16, 1994, pp. 1278-1287.

Burgett et al., "A Novel Method for Copyright Labeling Digitized Image Data," Sep. 1994, 12 pages.

Cox et al., "Secure spread spectrum watermarking for multimedia," *IEEE Transactions on Image Processing*, vol. 6, No. 12, pp. 1673-1687, Dec. 1997.

Deguillaume et al., "Robust 3D DFT Video Watermarking," *Proc. SPIE vol. 3657: Security and Watermarking of Multimedia Contents*, Jan. 1999, pp. 113-124.

Dittmann, Jana et al., "Robust MPEG Video Watermarking Technologies", ACM Multimedia '98, Bristol, UK, 1998, pp. 71-80.

Echizen et al., "General Quality Maintenance Module for Motion Picture Watermarking," *IEEE Trans. on Consumer Electronics*, vol. 45, No. 4, Nov. 1999, pp. 1150-1158.

Hartung et al., Digital Watermarking of Raw and Compressed Video, Proc. SPIE 2952, Digital Compression Technologies and Systems for Video Communications, Oct. 1996, pp. 205-213.

Hartung et al., "Multimedia watermarking techniques," *Proceedings of the IEEE*, vol. 87, No. 7, pp. 1079-1107, Jul. 1999.

Hartung, et al., "Watermarking of uncompressed and compressed video," *Signal Processing*, vol. 66, No. 3, pp. 283-301, May 1998.

Herrigel et al., "The watermark template attack," *Proceedings of the SPIE Security and Watermarking of Multimedia Contents III*, Wong, Delp, Editors, vol. 4314, San Jose, California, Jan. 22-25, 2001, pp. 394-405.

Highwater FBI, "Copyright Protection for Digital Images, Digital Fingerprinting from FBI," Brochure, 4 pgs. 1995.

Holliman et al., "Adaptive Public Watermarking of DCT-Based Compressed Images," SPIE vol. 3312, Dec. 1997, pp. 284-295.

JPEG Group's JPEG Software (release 4), FTP.CSUA.Berekeley. EDU/PUB/Cypherpunks/Applications/JSTEG/JPEG. Announcement.GZ, Jun. 1993, 2 pages.

Kalker et al., "A video watermarking system for broadcast monitoring," *Proceedings of the SPIE Security and Watermarking of Multimedia Contents*, vol. 3657, Jan. 25-27, 1999, San Jose, California, pp. 103-112.

Kawaguchi et al., "Principle and Applications of BPCS-Steganography," Proc. SPIE vol. 3528: Multimedia Systems and Applications, Nov. 2-4, 1998, pp. 464-473.

Kim et al., "An Object-based Video Watermarking," *Proc. Int. Conf. on Consumer Electronics*, Jun. 1999, pp. 100-101.

Koch et al., "Copyright Protection for Multimedia Data," Proc. Of the Int. Conf. On Digital Media and Electronic Publishing, Leeds, U.K., Dec. 1994, 15 pages.

Komatsu et al., "A Proposal on Digital Watermark in Document Image Communication and Its Application to Realizing a Signature," Electronics and Communications in Japan, Part 1, vol. 73, No. 5, 1990, pp. 22-33.

Komatsu et al., "Authentication System Using Concealed Image in Telematics," Memoirs of the School of Science & Engineering, Waseda Univ., No. 52, 1988, pp. 45-60.

Langelaar et al., "Watermarking digital image and video data: A state-of-the-art overview," *IEEE Signal Processing Magazine*, vol. 17, No. 5, pp. 20-46, Sep. 2000.

Langelaar et al., "Robust Labeling Methods for Copy Protection of Images," Proc. SPIE Electronic Imaging '97: Storage and Retrieval of Image and Video Databases V, Feb. 1997, pp. 298-309.

Langelaar et al., "Copy Protection for Multimedia Data based on Labeling Techniques," Jun. 1996, 9 pages.

Langelaar et al., "Watermarking by DCT Coefficient Removal: A Statistical Approach to Optimal Parameter Settings," SPIE vol. 3657, Jan. 1999, pp. 2-13.

Langelaar et al., "Optimal differential energy watermarking of DCT encoded images and video," *IEEE Transactions on Image Processing*, vol. 10, No. 1, pp. 148-158, Jan. 2001.

Lee et al., "Adaptive Video Watermarking Using Motion Information," *Proc. SPIE* vol. 3971: *Security and Watermarking of Multimedia Contents II*, Jan. 2000, pp. 209-216.

Lin et al., "Streaming video and rate scalable compression: What are the challenges for watermarking?", *Proceedings of the SPIE Security and Watermarking of Multimedia Contents III*, Wong, Delp, Editors, vol. 4314, Jan. 22-25, 2001, San Jose, California, pp. 116-127.

Lin et al., "Temporal synchronization in video watermarking," *Proceedings of the SPIE Security and Watermarking of Multimedia Contents IV*, Wong, Delp, Editors, vol. 4675, Jan. 21-24, 2002, San Jose, California, pp. 478-490.

Lin, et al., "Rotation, scale, and translation resilient watermarking for images," *IEEE Transactions on Image Processing*, vol. 10, No. 5, pp. 767-782, May 2001.

Matsui et al., "Video-Steganography: How to Secretly Embed a Signature in a Picture," IMA Intellectual Property Project Proceedings, Jan. 1994, vol. 1, Issue 1, pp. 187-205.

Mora-Jimenez et al., "A new spread spectrum watermarking method with self-synchronization capabilities," *Proceedings of the IEEE International Conference on Image Processing '00*, Vancouver, Canada, Sep. 10-13, 2000.

Nicholson et al., "Watermarking in the MPEG4 context," *European Conference on Multimedia Applications Services and Techniques*, Madrid, Spain, May 1999, pp. 472-492.

Ogihara et al, "Data Embedding into Pictorial Images with Less Distortion Using Discrete Cosine Transform," Proceedings of ICPR 96, IEEE, pp. 675-679, Aug. 1996.

O'Ruanaidh, "Rotation, Scale and Translation Invariant Digital Image Watermarking," Signal Processing, pp. 2-15, May 1, 1998.

O'Ruanaidh, "Rotation, Scale and Translation Invariant Digital Image Watermarking," 1997 IEEE, pp. 536-539.

J. 'O Ruanaidh and G. Csurka, "A bayesian approach to spread spectrum watermark detection and secure copyright protection for digital image libraries", *Proceedings of the IEEE Conference on Computer Vision and Pattern Recognition*, Fort Collins, Colorado, USA, Jun. 1999.

Pereira et al., "Template based recovery of Fourier-based watermarks using log-polar and log-log maps," *Proceedings of the IEEE International Conference on Multimedia Computing and Systems*, vol. 1, 1999, pp. 870-874.

Piva et al., "A DWT-Based Object Watermarking System for MPEG-4 Video Streams," *Proceedings of the IEEE International Conference on Image Processing '00*, vol. 3, Vancouver, Canada, 2000, pp. 5-8.

Sheng, "Experiments on Pattern Recognition Using Invariant Fourier-Mellin Descriptors," Journal of Optical Society of America, vol. 3, No. 6, pp. 771-776, 1986.

Sullivan et al., "Rate-distortion optimization for video compression," *IEEE Signal Processing Magazine*, vol. 15, No. 6, Nov. 1998, pp. 74-90.

Suthaharan et al. "Perceptually Tuned Video Watermarking Scheme using Motion Entropy Masking," *Proc. IEEE Region 10 Conf.*, Sep. 1999, pp. 182-185.

Swanson et al., "Multimedia data-embedding and watermarking technologies," *Proceedings of the IEEE*, vol. 86, No. 6, pp. 1064-1087, Jun. 1998.

Swanson et al., "Object-Based Transparent Video Watermarking," *Proc. IEEE First Workshop on Multimedia Signal Processing*, Jun. 1997, pp. 369-374.

Swanson et al., "Multiresolution Scene-Based Video Watermarking Using Perceptual Models," *IEEE Journal on Selected Areas in Communications*, vol. 16, No. 4, May 1998, pp. 540-550.

Szepanski, "A Signal Theoretic Method for Creating Forgery-Proof Documents for Automatic Verification", 1979 Carnahan Conference on Crime Countermeasures, University of Kentucky, Lexington, Kentucky, May 16-18, 1979.

Szepanski, "Compatibility Problems in Add-On Data Transmission for TV-Channels," 2d Symp. and Tech. Exh. On Electromagnetic Compatibility, Jun. 28, 1977, pp. 263-268.

Szepanski, "Binary Data Transmission Over Video Channels with Very Low Amplitude Data Signals," Fernseh- und Kino-Technik, vol. 32, No. 7, Jul. 1978, pp. 251-256 (German text with full English translation).

Szepanski, Additive Binary Data Transmission for Video Signals, Conference of the Communications Engineering Society, 1980, NTG Technical Reports, vol. 74, pp. 343-351 (German text with full English translation).

Tanaka, "Embedding the Attribute Information Into a Dithered Image," Systems and Computers in Japan, vol. 21, No. 7, 1990, pp. 43-50.

Tanaka et al., Embedding Secret Information Into a Dithered Multi-Level Image, 1990 IEEE, pp. 216-220.

van den Branden Lambrecht et al., "Perceptual quality measure using a spatio-temporal model of the human visual system," *Proceedings of the SPIE Digital Video Compression: algorithms and Technologies 1996*, vol. 2668, San Jose, California, Jan. 28-Feb. 2, 1996, pp. 450-461.

van Schyndel et al., "A Digital Watermark," IEEE International Conference on Image Processing, Nov. 13, 1994 pp. 86-90.

Weighted PSNR for images as in Certimark: S. Voloshynovskiy, S. Pereira, V. Iquise and T. Pun, "Attack modeling: Towards a second generation benchmark," *Signal Processing, Special Issue: Information Theoretic Issues in Digital Watermarking*, May, 2001. V. Cappellini, M. Barni, F. Bartolini, Eds.

Wang et al., "A universal image quality index," *IEEE Signal Processing Letters*, vol. 9, No. 3, Mar. 2002.

Watson et al., "Digital video quality metric based on human vision," *Journal of Electronic Imaging*, vol. 10, No. 1, pp. 20-29, 2001.

Webster et al., "An objective video quality assessment system based on human perception," *Proceedings of the Human Vision, Visual Processing, and Digital Displays IV*, Feb. 1993, San Jose, CA, pp. 15-26.

Westen et al., "Spatio-temporal model of human vision for digital video compression," *Proceedings of the SPIE Human Vision and Electronic Imaging II*, Rogowitz, Pappas, Editors, vol. 3016, San Jose, CA, 1997, pp. 260-268.

U.S. Appl. No. 60/308,718, Lubin et al., filed Jul. 30, 2001.

U.S. Appl. No. 11/265,766, Levy, filed Nov. 1, 2005.

U.S. Appl. No. 09/413,117, filed Oct. 6, 1999, Geoffrey B. Rhoads.

U.S. Appl. No. 09/507,096, filed Feb. 17, 2000, Geoffrey B. Rhoads; Bruce L. Davis.

U.S. Appl. No. 09/482,749, filed Jan. 13, 2000, Geoffrey B. Rhoads.

U.S. Appl. No. 09/343,104, filed Jun. 29, 1999, W. Perry; Phillip A. Seder.

U.S. Appl. No. 09/697,009, filed Oct. 25, 2000, W. Perry; Phillip A. Seder.

U.S. Appl. No. 09/633,587, filed Aug. 7, 2000, Geoffrey B. Rhoads; William Y. Conwell.

U.S. Appl. No. 09/567,405, filed May 8, 2000, Geoffrey B. Rhoads; J. Scott Carr; Brett T. Hannigan.

U.S. Appl. No. 09/689,289, filed Oct. 11, 2000, Geoffrey B. Rhoads; J. Scott Carr.

U.S. Appl. No. 09/629,649, filed Aug. 1, 2000, J. Scott Carr; Brett T. Hannigan; Geoffrey B. Rhoads.

U.S. Appl. No. 09/522,998, filed Apr. 19, 2000, W. Perry; Phillip A. Seder.

U.S. Appl. No. 09/697,015, filed Oct. 25, 2000, Bruce L. Davis.

U.S. Appl. No. 09/343,101, filed Jun. 29, 1999, Bruce L. Davis; Geoffrey B. Rhoads; Phillip A. Seder.

U.S. Appl. No. 09/428,493, filed Mar. 30, 2000, Geoffrey B. Rhoads.

U.S. Appl. No. 12/912,461, filed Oct. 26, 2010, Adnan M. Alattar.

US 7,949,147 B2

WATERMARKING COMPRESSED DATA

RELATED APPLICATION DATA

This application is a continuation of application Ser. No. 10/953,134, filed Sep. 28, 2004 (Now U.S. Pat. No. 7,139,408), which is a continuation of application Ser. No. 09/778,307, filed Feb. 6, 2001 (Now U.S. Pat. No. 6,798,894), which is a continuation of application Ser. No. 09/138,061, filed Aug. 21, 1998 (Now U.S. Pat. No. 6,229,924), which claims the benefit of patent application Ser. No. 60/056,968, which was filed on Aug. 26, 1997. These prior patents and patent applications are hereby incorporated by reference.

TECHNICAL FIELD

The invention relates to digital watermarking.

BACKGROUND AND SUMMARY

The advent of technology for storing images on digital media has increased the need for a method to protect against piracy. Images stored on prior forms of media (e.g. VHS, Beta, audiotapes, etc.) are inherently degraded when copied. Images stored on digitally encoded media can be copied with no degradation; therefore, perfect copies of copies of copies, etc. can be made.

The introduction of Digital Versatile Discs (DVD) containing movies has created increased incentives for both casual and professional unauthorized copying. At the movie industry's urging, technology has been put in place to protect against simple duplication of DVD disks using equipment available to unsophisticated consumers. This is similar to the protection that exists which prevents one from duplicating a VCR tape by connecting together two commercially available VCRs.

While such protection mechanisms protect against some types of copying, a personal computer connected to a DVD device present a much more complicated problem. Open architecture devices such as personal computers reproduce the signals in the "clear" and such devices have many entry points, which can be used to duplicate material once it is in the "clear". Some embodiments of the invention use digital watermarks to address the above described problem. The invention also has other applications.

The invention provides a method of embedding auxiliary data in coefficients generated for a compressed data stream. The method receives coefficients in a data stream in which the coefficients are divided into blocks. It changes the value of selected coefficients to embed multi-bit message data in the coefficients. The process of changing the coefficients includes controlling changes to the selected coefficients from different blocks so that the relationship of the selected coefficients from the different blocks satisfy an embedding rule. One embedding rule causes the embedded data to form a pattern across the blocks. Another rule causes coefficients of blocks to have a desired phase relationship. Another rule enforces entropy and/or bit rate constraints onto the data stream.

Another aspect of the invention is a method of embedding auxiliary data in coefficients generated for a compressed data stream. This method receives coefficients in the data stream and changes the value of selected coefficients to embed multi-bit message data in the coefficients. The changing of coefficients includes controlling changes to entropy codes representing the selected coefficients, and these changes are made so as to satisfy an established bit rate constraint.

This document also describes methods and related systems for embedding and detecting watermarks in compressed data formats, such as JPEG or MPEG formatted images as well as other types of image signals. One method receives transform coefficients of the image, and changes the value of selected coefficients to embed watermark data in the coefficients. The changing of the coefficients is controlled such that it both embeds the data and forms an orientation signal that facilitates determination of rotation or scale of the image.

For example, to facilitate the detection of digital watermarks, one can insert a watermark signal that forms an orientation signal called a grid. The grid can be used to determine orientation and scale. In one embodiment described in this document, the data signal and the grid signal are integrated into a single watermark signal in such a manner that the visual artifacts introduced by the watermark are minimized.

Another aspect of this disclosure is a variation of embedding a watermark in an image. This method receives message bits to be embedded in the image, receives transform coefficients of the image, and maps the message bits to selected transform coefficients. The method changes the value of selected coefficients to embed data in the coefficients. The characteristics of the image are used to control the change of transform coefficients to embed the watermark, and a bit rate control is used to modify the change of transform coefficients to embed the watermark according to a bit rate limit.

In applications such as DVD storage of content, an important factor that needs be considered is the bit rate of the bit stream. There are disadvantages if introduction of a watermark into a bit stream changes the bit rate. For example if images are going to be recorded on a medium such as a DVD disc, increasing the number of bits in the bit stream will decrease the number of images that can be recorded on a single disk. It is known that, in general, adding a watermark to a stream of images will increase the number of bits in the bit stream. An embodiment provides a method and apparatus, which preserves the bit rate even though watermarks are introduced into the images.

JPEG and MPEG data compression techniques transform images utilizing a discrete cosine transform (DCT) which produces a matrix of DCT coefficients. These coefficients are arranged into blocks (e.g., into 8 by 8 blocks of coefficients). The blocks of DCT coefficients are in turn arranged into macro blocks (e.g., into 16 by 16 arrays containing four 8 by 8 blocks). In one embodiment of a digital watermark encoder, selected DCT coefficients in each block are slightly increased or slightly decreased in response to a watermark signal. The changes in the blocks that comprise each macro block are done in a coordinated manner so that the phase of the watermark signal is preserved across the block boundaries. By preserving the phase across block boundaries, a detectable grid is formed which can be used as an orientation and scaling grid.

An embodiment of the watermark encoder also maintains the bit rate of the image signal. The bit rate of the signal is preserved by maintaining a count (referred to as the cumulative change count) that represents the amount that the bit rate has been increased by changes in coefficients less the amount that the bit rate has been decreased by changes in the coefficients. If at any time the cumulative change count exceeds a pre-established limit, coefficient changes that decrease the cumulative change count continue; however, coefficient changes that increase the cumulative change count are suspended. The suspension of coefficient changes that increase the cumulative change count continues until the cumulative change count falls below the pre-established limit. The above described process can be described as selectively changing the intensity of a watermark signal in a bit stream so as to prevent the entropy of the combined signal from exceeding a pre-established limit.

Further features will become apparent with reference to the following detailed description and accompanying drawings.

DETAILED DESCRIPTION

The MPEG (Motion Picture Expert Group) and JPEG (Joint Photographic Expert Group) image compression techniques use a DCT (Discrete Cosine Transform) to generate a matrix of coefficients. An embodiment of the invention shown herein slightly modifies the DCT coefficients (either slightly increases or slightly decreases the value of the coefficients) so as to embed a digital watermark in the image. Such a digital watermark can later be detected by cross correlation techniques.

Figure 1:
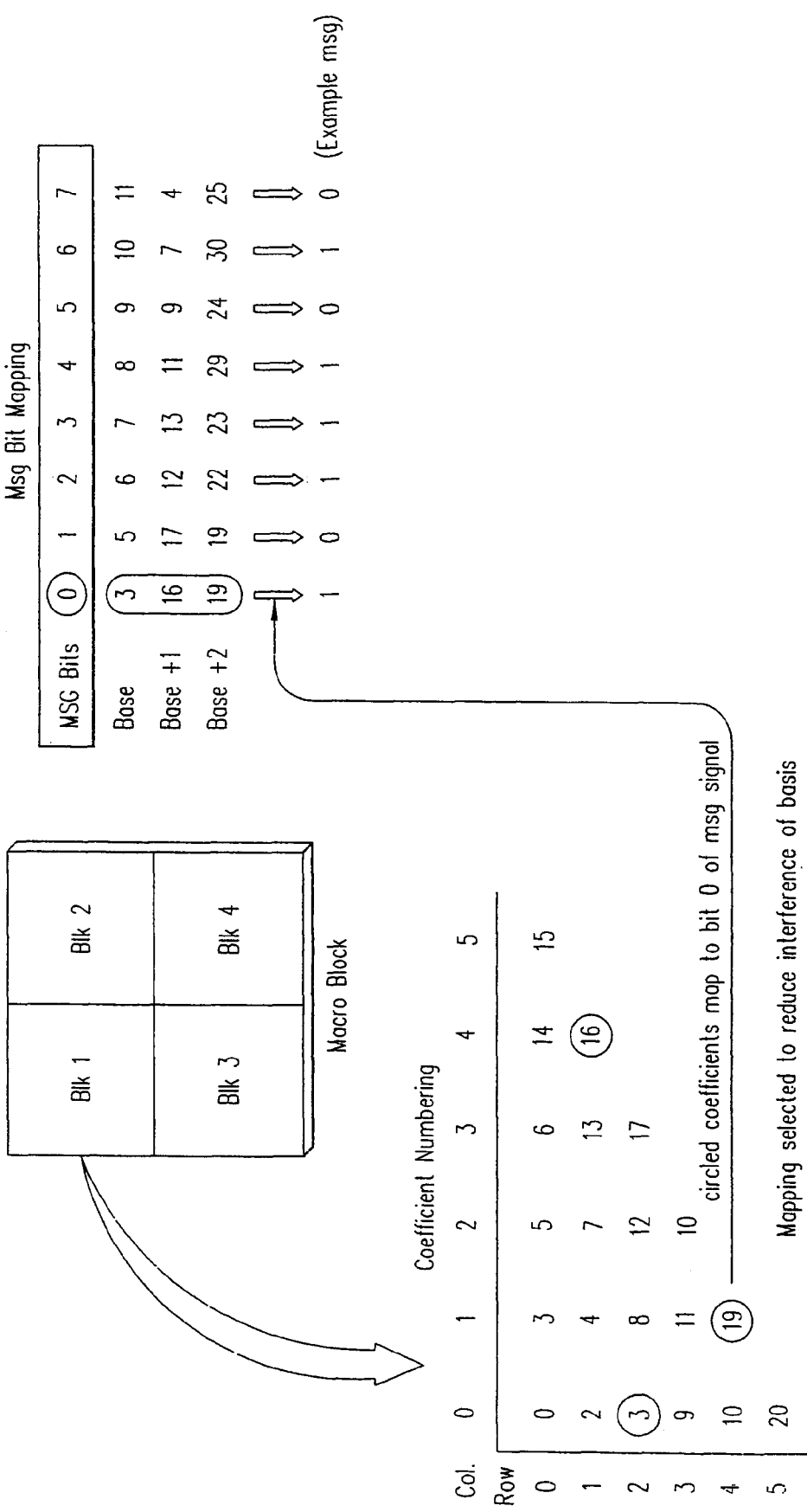
FIG. 1 is a diagram illustrating how the pixels in an image are arranged into blocks and how the resulting DCT coefficients are numbered.
Figure 2:
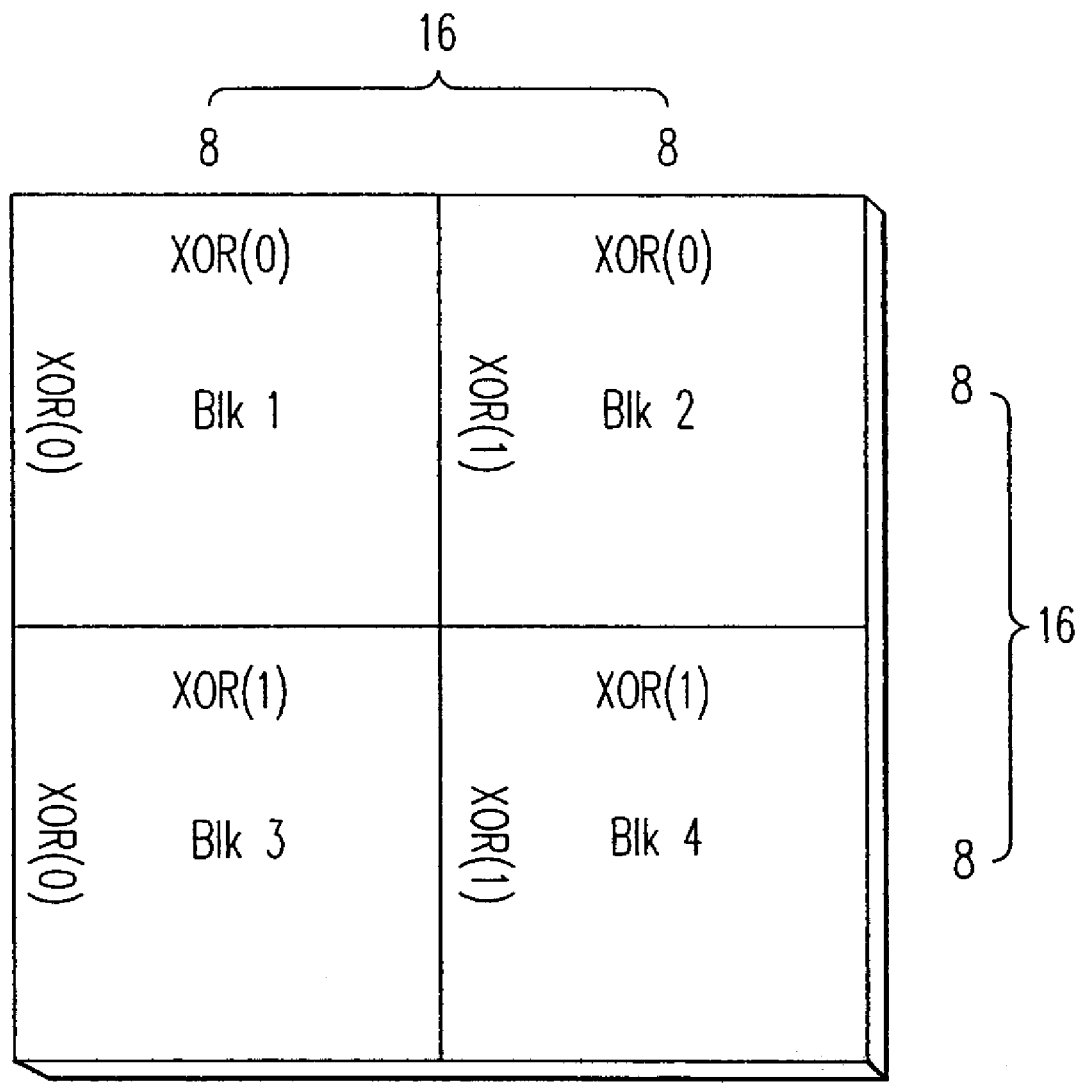
FIG. 2 is a diagram, which shows how the blocks of DCT coefficients are arranged into macro blocks.

As illustrated in FIG. 1, the MPEG and JPEG techniques divide an image into 8 by 8 blocks of pixels. Each block of pixels is then used to generate an eight by eight block of DCT coefficients. The 8 by 8 blocks of coefficients are divided into "macro blocks", each of which consists of four of the original blocks. This is illustrated in FIG. 2. The rows and columns of DCT coefficients in each block are numbered from top to bottom and left to right as illustrated in FIG. 1. The first row and the first column are designated as the "0" row and "0" column.

Certain of the DCT coefficients in each block are selected as the coefficients that will carry a selected bit of the digital watermark signal. In one embodiment, the three coefficients circled in FIG. 1 are used to carry the first or "0" bit of the watermark data signal. These three coefficients are modified, that is, either slightly increased or slightly decreased depending upon the value of the "0" bit of the watermark data. In a similar manner, other coefficients are slightly changed in order to carry the other bits of the watermark signal.

One aspect of the embodiment is directed to insuring that the sinusoids generated by the changes made to the DCT coefficients are continuous, that is, in-phase across the four blocks that constitute each macro block. First, if the sinusoids that carry the watermark are continuous across each macro block, there will be less edge effects and the watermark will be less visually noticeable. Second, the sinusoids which are continuous over the four blocks of each macro block create a low level orientation or grid signal. This low level grid signal can be detected to determine the orientation and scale of the watermark. The grid signal can then be detected using cross correlation techniques. Cross correlation detection techniques are for example shown in patent application Ser. No. 08/649,149 filed May 16, 1996 (Now U.S. Pat. No. 5,862, 260) and in issued patent U.S. Pat. Nos. 5,748,763 and 5,748, 783.

If certain DCT coefficients in adjacent blocks are modified in the same direction, the resulting sinusoids will not be continuous across block boundaries. In the embodiment, the changes made to the coefficients of each of the four blocks in a macro block are coordinated so that the resulting sinusoids will be continuous across block boundaries within each macro block. The changes are coordinated using the rules explained below.

The blocks in each macro block are numbered as shown in FIG. 2. Block one is considered the base block. The coefficients in this block are changed in a conventional way by the associated bits of the watermark signal. Note, the following paragraphs relate to how the coefficients which are circled in FIG. 1 are changed in response to the "0" bit of the watermark. It should be understood that other coefficients must be similarly changed to carry the other bits in the watermark data.

In block 1, the coefficients that are circled in FIG. 1 are slightly increased or slightly decreased in response to the "0" bit of the watermark data. In blocks 2, 3 and 4, the circled coefficients shown in FIG. 1 are changed in response to the zero bit of the watermark according to the following rules.

Block 2: invert the direction of the change if the coefficient is in an odd row.

Block 3: invert the direction of the change if the coefficient is in an odd column Block 4: invert the direction of the change if the coefficient is in an odd row or if it is in and odd column, but do not invert the direction of the change if the coefficient is in both and odd row and in an odd column.

If the above rules are followed the sinusoids generated by the change in the DCT coefficients will be continuous across the boundaries in the four blocks that form each macro block. These sinusoids will be able to be detected using cross correlation techniques, and they can be used as a grid to determine the scale and rotation of the image. The data bits in the watermark will also be able to be detected using conventional watermark detection techniques. Thus, the watermark data itself is used to form the grid that can be used to determine scale and rotation.

Figure 3:
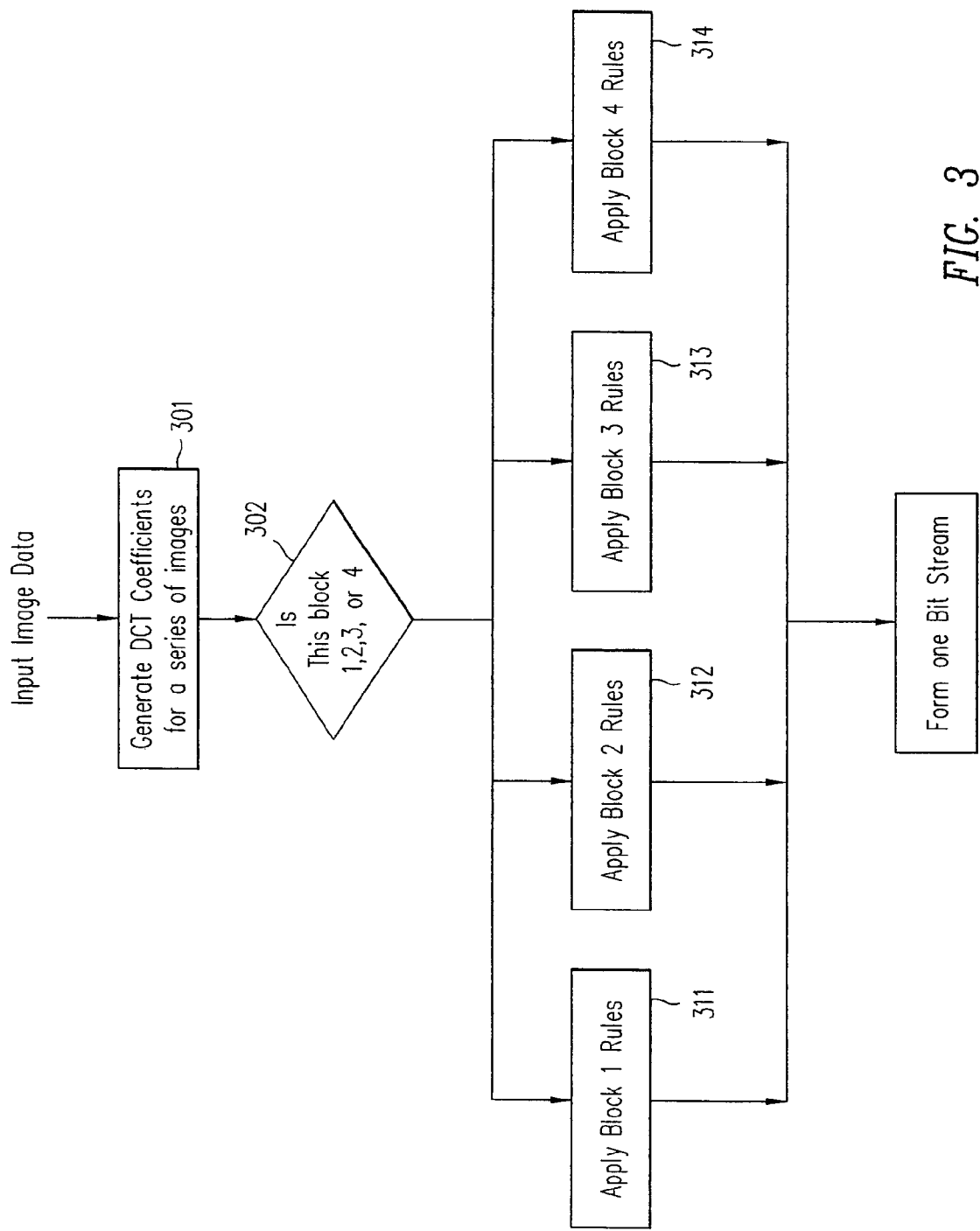
FIG. 3 is a program flow diagram showing how the coefficients in each block of a macro block are treated so as to preserve the phase of watermark signal in each macro block.

FIG. 3 is an overall program flow diagram of the above described aspect of an embodiment. The system accepts a stream of data that represents images. Block 301 is a conventional device or program module that generates DCT coefficients for the images in the data stream. These coefficients are sent to a decision unit 302 which separates the data into macro blocks and sends it to units 311, 312, 313 and 314 depending upon whether the data represents a block 1, 2, 3 or 4 in a macro block. Units 311-313 modify the DCT coefficients in order to imbed a watermark signal according to the following rules.

Unit 311: modify the coefficients in a conventional manner to imbed watermark.

Unit 312: invert the direction of the change if the coefficient is in an odd row.

Unit 313: invert the direction of the change if the coefficient is in an odd column Unit 314: invert the direction of the change if the coefficient is in an odd row or if it is in and odd column, but do not invert the direction of the change if the coefficient is in both and odd row and in an odd column.

The output of units 322 to 314 is combined by unit 320 back into a single data stream. It is noted that each of the units shown in FIG. 3 could be separate units, which are either programmed, or hardwired to perform the specified functions. Alternatively, all of the functions could be performed in a single programmed computer on a time-shared basis. The unit which generates DCT coefficients is conventional and such units are known.

The previous discussion describes how a watermark can be introduced in the DCT domain. It is noted that the durability of the overall watermarking can be increased by using two watermarks. One watermark can be added by modification of the pixels in the original image in the manner as described in U.S. Pat. Nos. 5,748,763 or 5,748,783 and then a second watermark can be added by modification of the coefficients in the DCT domain as described herein.

Another problem addressed by the present invention is the need to maintain a constant bit rate in a stream of bits representing a series of images even though watermarks are added to the images. It is noted that MPEG and JPEG systems use variable length codes to represent data; hence, adding watermarks generally increases the bit rate of a data stream. In some watermarking systems, a watermark has no correlation with the image into which the watermark is embedded. Thus, embedding a watermark in an image produces an image which has higher entropy than the original image. The bit rate of a data stream transmitting an image correlates directly to the entropy of the image.

Typically the number of codes used to code an image, that is, the number of entries in the Huffman table of a coded image, is relatively large (e.g., 500). However, the changes that occur when a watermark is introduced into an image can be illustrated with following simple example. Consider a data stream that has only four symbols, s1, s2, s3 and s4, which are encoded as follows:

| Symbol | code |
|--------|------|
| s1     | 0    |
| S2     | 01   |
| S3     | 110  |
| S4     | 111  |

Then consider a data stream as follows:

| Bit stream:     | 0011010111010              |
|-----------------|----------------------------|
| Decoded stream  | 0/0/110/10/111/0/10        |
| Decoded message:| s1, s2, s3, s2, s4, s1, s2 |

When a watermark is added to an image the bits in the image are slightly changed. In the above simplistic illustrative example, in some situation the symbol s2 would be changed to the symbol s3 and hence the number of bits in a bit stream which transmits the image would be increased. In fact, there are mathematical principles (not explained herein) which show that when a normally distributed watermark (that is, a watermark with a Gaussian distribution) is added to an image, and the image is transmitted using variable length Huffman codes, the length of the bit stream will of necessity be increased.

One embodiment of the encoder uses a technique for insuring that when a watermark is added to a data stream, the bit rate will be maintained constant. It is noted that the embodiment does not violate the above-described mathematical principle because some of the redundancy normally used to watermark images is in certain circumstances decreased. That is, in certain circumstances the intensity of the watermark is decreased.

In the embodiment, the watermark is modified in response to characteristics of the image. Thus, to some extent the watermark is correlated to the image into which the watermark in embedded. In this way, a watermark can be embedded into an image and the entropy of the combined image and watermark will be substantially equal to the entropy of the watermark alone.

In the embodiment, the encoder system maintains a cumulative count of the amount that the coefficients have been changed to any point in time. That is, the amount of positive changes less the amount of negative changes made since the beginning of the bit stream is tracked. This amount is herein referred to as the cumulative change count. If at any time, the cumulative change count exceeds a pre-established positive limit, no further positive changes are made.

Normally, it is only necessary to insure that changes do not increase the bit rate unduly; however, in some instances it may also be desirable to insure that changes do not unduly decrease the bit rate. If this is desired, the same technique as described above can be used to insure that the cumulative change amount does not exceed a pre-established negative limit. That is, if the cumulative change amount exceeds a pre-established negative value, positive changes continue in a normal manner, but no further negative changes are made.

The magnitude of the pre-established maximum (and in both a positive and negative direction) are established at the values which constitutes the change in bit rate which can be tolerated in a particular system.

Figure 4:
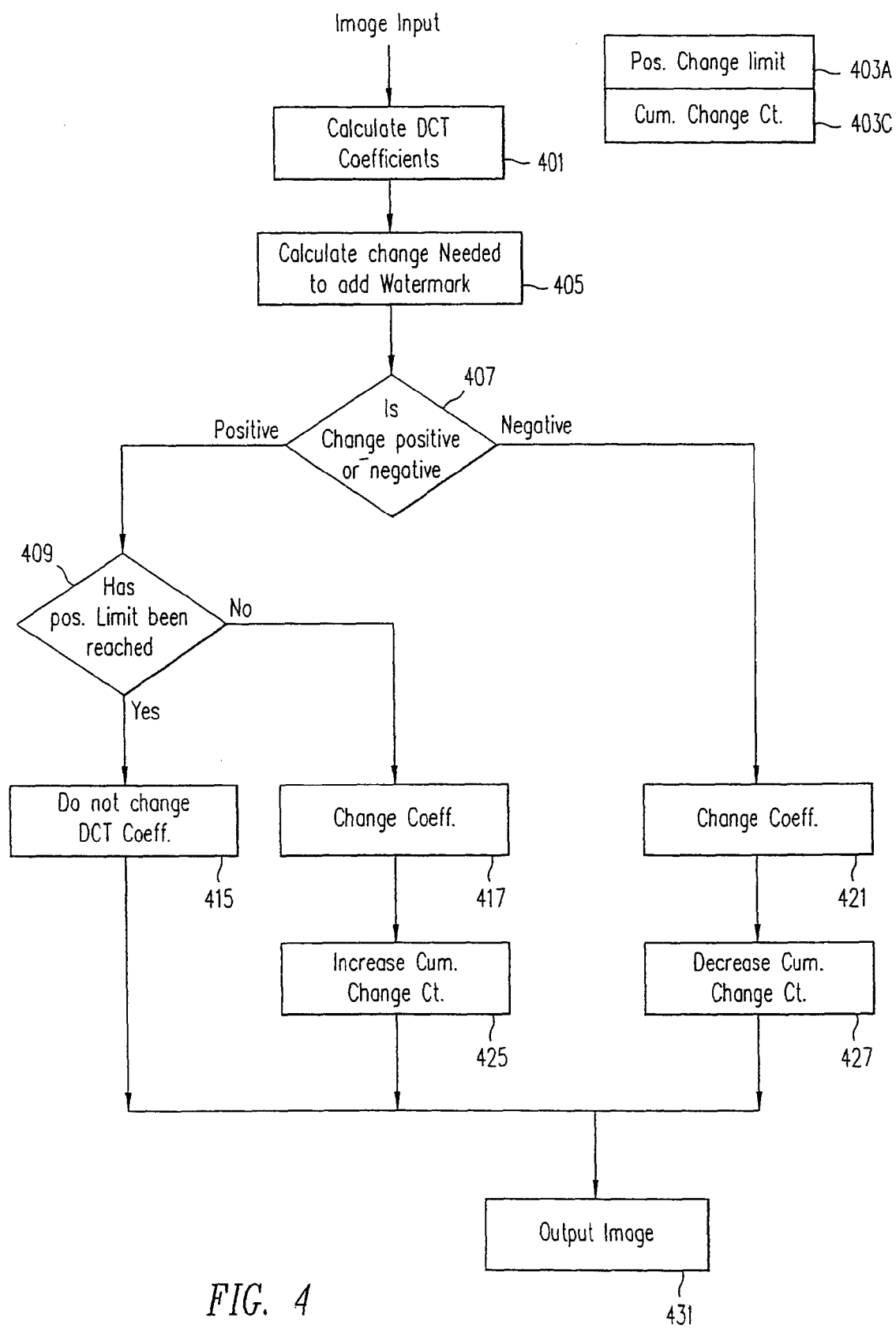
FIG. 4 is a program flow diagram showing how the bit rate in the data stream is maintained constant.

FIG. 4 is a program flow diagram showing how the data rate is maintained constant not withstanding the fact that watermarks are added to the images in the data stream. Block 403A shows that a limit on the amount of positive changes that can be made to DCT coefficients is established and stored. Blocks 403C shows that the cumulative change amount is stored. The cumulative change amount is the amount of positive changes less the amount of negative changes that have been made to coefficients since the start of the data stream.

The DCT coefficients are calculated in the normal manner as indicated by block 401. Likewise the change in each the DCT coefficients needed to embed the watermark is also calculated in the normal manner as shown by block 405. Block 405 shows that a check is made to determine if the needed change in a particular DCT coefficient is positive or negative. Block 409 indicates that if the change is positive a check is made to determine if the maximum allowable cumulative change amount stored in block 403A will be exceeded if the change is made.

Blocks 415, and 417 indicate that the coefficients will only be changed, if the change does not cause the cumulative change amount to exceed the limit in 403A. Finally as indicated by blocks 425 and 427, the cumulative change amount in register 403C is incremented or decremented if a change to the coefficients is in fact made. Block 431 indicates that the coefficients are sent to the output of this process and they are then transmitted and processed in a normal manner.

It is noted that this embodiment relates to embedding a watermark in an image. Various know techniques can be used to detect watermarks embedded in images utilizing this approach. For example techniques such as those described in U.S. Pat. Nos. 5,748,763, and 5,748,783 or in the "Communications of the ACM" July 1998/vol 41, No. 7 or in U.S. application Ser. No. 08/746,613 filed Nov. 12, 1996 (Now U.S. Pat. No. 6,122,403) and Ser. No. 08/649,419 which was filed May 16, 1996 (Now U.S. Pat. No. 5,862,260) (all of which are hereby incorporated herein by reference) could be used.

While the process has been described above as one where a change is either made or not made, it should be understood that alternatively, the amount of the change could be decreased if the limit in the cumulative change value is being approached. It is also noted that the system shown in FIG. 4 prevents the cumulative change value from exceeding a pre established positive limit. Since adding a watermark to an image generally increases the entropy of the image and since Huffman code tables are normally constructed such that an increase in entropy result in increased bit rate, the use of only a positive limit is normally appropriate. However, in some situations, it may be appropriate to track if the cumulative change amount exceeds a limit in both the positive and negative directions. Such a check could be added to FIG. 4 prior to block 427.

It is recognized that by implementing the described embodiment, the strength of the watermark is in some cases reduced. However, the reduction is not sufficient to prevent detection of the watermark. The changes made with the above embodiment merely lower the intensity of the watermark in a selective manner. Thus, in some instances, more processing may be required to detect the watermark.

In many systems, each Huffman code covers several symbols. In such systems the calculation indicated by block 405 is not the change in a single symbol that results from adding a watermark to the image. In such systems the calculation indicated by block 405 is a calculation of the change that results in the bit string of whatever combination of symbols used in the Huffman code to represent a symbol. In some cases the calculation might have to be done over several combinations of symbols.

It is also noted that various aspects of the present invention are shown herein in a single embodiment. Other alternative embodiments could use one but not all aspects of the invention. For example, the part that relates to maintaining bit rate could be used in embodiments which do not use macro blocks to establish an orientation grid. Likewise the aspect which relates to the use of macro blocks could be used without the part that relates to maintaining a constant bit rate. Finally, while the invention has been shown in an embodiment that inserts a watermark in the DCT domain, the invention could be used in applications where watermarks are inserted in other domains.

While the invention has been shown and described with respect to preferred embodiments of the invention, various changes in form and detail could be made without departing from the spirit and scope of the invention. The applicant's invention is limited only by the appended claims.

We claim:

1. A method comprising:
   in a programmed or hardwired processing unit, receiving coefficients in a data stream, wherein the coefficients are divided into blocks;
   using the programmed or hardwired processing unit, changing a value of selected coefficients to embed multi-bit message data in the coefficients, the changing including controlling changes to the selected coefficients from different blocks so that a relationship of the selected coefficients from the different blocks satisfies an embedding rule.

2. The method of claim 1, wherein the embedding rule comprises a phase relationship of the selected coefficients from the different blocks.

3. The method of claim 1, wherein the changing of the value of the selected coefficients comprises changing of the selected coefficients such that the changing embeds the multi-bit message data and forms an orientation signal that facilitates determination of rotation or scale of an image represented by the coefficients.

4. The method of claim 1, wherein the coefficients comprise Discrete Cosine Transform coefficients.

5. The method of claim 1, wherein the coefficients are extracted from compressed image blocks.

6. The method of claim 1, wherein the multi-bit message data comprises message bits, and wherein a message bit is mapped to the selected coefficients.

7. The method of claim 1, wherein the changing of the value of the selected coefficients to embed the multi-bit message data is modified by a characteristic of an image corresponding to the coefficients.

8. The method of claim 1, wherein the changing of the value of the selected coefficients to embed the multi-bit message data is modified to control a bit rate of an image corresponding to the coefficients according to a bit rate limit.

9. The method of claim 3, wherein the orientation signal is formed by embedding message bits according to the embedding rule.

10. The method of claim 1, wherein the coefficients form part of a video.

11. The method of claim 1, wherein the changes are made to entropy coded symbols representing the selected coefficients.

12. The method of claim 11, wherein the changes to the entropy coded symbols are controlled to maintain a bit rate of the data stream within a desired level.

13. A method comprising:
    in a programmed or hardwired processing unit, receiving coefficients in a data stream; and
    using the programmed or hardwired processing unit, changing a value of selected coefficients to embed multi-bit message data in the coefficients, the changing including controlling changes to entropy codes representing the selected coefficients so as to satisfy an established bit rate constraint.

14. A non-transitory computer readable medium on which is stored instructions, the instructions comprising:
    instructions to receive coefficients in a data stream, wherein the coefficients are divided into blocks;
    instructions to change a value of selected coefficients to embed multi-bit message data in the coefficients, the changing including controlling changes to the selected coefficients from different blocks so that a relationship of the selected coefficients from the different blocks satisfies an embedding rule.

15. A non-transitory computer readable medium on which is stored instructions, the instructions comprising:
    instructions to receive coefficients in a data stream; and
    instructions to change a value of selected coefficients to embed multi-bit message data in the coefficients, the changing including controlling changes to entropy codes representing the selected coefficients so as to satisfy an established bit rate constraint.

16. The non-transitory computer readable medium of claim 14, wherein the embedding rule comprises a phase relationship of the selected coefficients from the different blocks.

17. The non-transitory computer readable medium of claim 14, wherein the changing of the value of the selected coefficients comprises changing of the selected coefficients such that the changing embeds the multi-bit message data and forms an orientation signal that facilitates determination of rotation or scale of an image represented by the coefficients.

18. The non-transitory computer readable medium of claim 14, wherein the coefficients comprise Discrete Cosine Transform coefficients.

19. The non-transitory computer readable medium of claim 14, wherein the coefficients are extracted from compressed image blocks.

20. The non-transitory computer readable medium of claim 14, wherein the multi-bit message data comprises message bits, and wherein a message bit is mapped to the selected coefficients.

21. The non-transitory computer readable medium of claim 14, wherein the changing of the value of the selected coefficients to embed the multi-bit message data is modified by a characteristic of an image corresponding to the coefficients.

22. The non-transitory computer readable medium of claim 14, wherein the changing of the value of the selected coefficients to embed the multi-bit message data is modified to control a bit rate of an image corresponding to the coefficients according to a bit rate limit.

23. The non-transitory computer readable medium of claim 17, wherein the orientation signal is formed by embedding message bits according to the embedding rule.

24. The non-transitory computer readable medium of claim 14, wherein the coefficients form part of a video.

25. The non-transitory computer readable medium of claim 14, wherein the changes are made to entropy coded symbols representing the selected coefficients.

26. The non-transitory computer readable medium of claim 25, wherein the changes to the entropy coded symbols are controlled to maintain a bit rate of the data stream within a desired level.

* * * * *

UNITED STATES PATENT AND TRADEMARK OFFICE
CERTIFICATE OF CORRECTION

PATENT NO.        : 7,949,147 B2
APPLICATION NO.   : 11/562357
DATED             : May 24, 2011
INVENTOR(S)       : Rhoads et al.

Page 1 of 1

It is certified that error appears in the above-identified patent and that said Letters Patent is hereby corrected as shown below:

Title Page 5, item (56), under "Other Publications", in Column 2, Line 9, delete "09/522,998," and insert -- 09/552,998, --.

Signed and Sealed this
Twentieth Day of September, 2011

David J. Kappos
*Director of the United States Patent and Trademark Office*